United States Patent [19]

Ishikawa

[11] Patent Number: 5,689,170
[45] Date of Patent: Nov. 18, 1997

[54] FAIL-SAFE CONTROL APPARATUS FOR ELECTRIC VEHICLE DRIVING MOTOR

[75] Inventor: Yasuki Ishikawa, Sagamihara, Japan

[73] Assignee: Nissan Motor Co., Ltd., Kanagawa-ken, Japan

[21] Appl. No.: 579,130

[22] Filed: Dec. 27, 1995

[30] Foreign Application Priority Data

Dec. 27, 1994 [JP] Japan .................................. 6-325962

[51] Int. Cl.[6] ............................................ B06L 3/00
[52] U.S. Cl. ............................................ 318/811; 318/799
[58] Field of Search ............................ 318/727, 792–811, 318/767–768, 139, 432, 434; 180/65.1, 65.3, 65.5, 65.8

[56] References Cited

U.S. PATENT DOCUMENTS

| 4,011,489 | 3/1977 | Franz et al. ............................ 388/811 |
| 5,155,797 | 10/1992 | Nomura et al. ...................... 388/815 |
| 5,357,181 | 10/1994 | Mutoh et al. ......................... 318/139 |

Primary Examiner—David S. Martin
Attorney, Agent, or Firm—Lowe, Price, LeBlanc & Becker

[57] ABSTRACT

A PWM generation block implements two-phase/three phase conversion of torque current and exciting current and, on the basis of the converted three-phase torque and exciting currents and a three-phase current for driving and controlling the drive motor, outputs a PWM signal. A torque current estimator receives the same three-phase current as that of the three-phase current input to the PWM generation block, and implement three-phase/two-phase conversion of a three-phase current, by using a phase angle output from the microcomputer to calculate and output estimation values of the torque and exciting currents. A first comparator compares the absolute value of amplitude and the phase angle of the motor primary current and the motor primary frequency which are respectively output from the microcomputer with those which are respectively output from a fail-safe control block. The first comparator outputs a fail-safe signal when it detects differences between the compared values. A second comparator compares the estimation values of the torque and exciting currents which are output from the torque estimator with the torque and exciting currents which are output from the fail-safe control block, respectively. The second comparator outputs a fail-safe signal when it detects differences between the signals compared thereby.

8 Claims, 6 Drawing Sheets

FAIL-SAFE CONTROL APPARATUS FOR ELECTRIC VEHICLE DRIVING MOTOR

BACKGROUND OF THE INVENTION

1. Field of the Invention

The present invention relates to a fail-safe control apparatus for an electric vehicle driving motor, in which a failure of a microcomputer or a current servo system constituting a controller is reliably detected in vector control used in control of an electric vehicle motor to perform a fail-safe operation.

2. Prior Art

A vector control which is developed to improve the efficiency of an induction motor used in an electric vehicle is a control scheme in which the position of a rotating magnetic field and the position of a rotor are detected to cause a current to flow into each pole at an optimum timing. A microcomputer must be used to efficiently perform this vector control scheme.

As a system for securing the safety of a control system constituted by a microcomputer used in vector control, for example, there is available a failure detection system for a microcomputer 102 using a watch dog timer (to be referred to as a WDT hereinafter) 101 shown in FIG. 1. In this failure detection system, a routine (not shown) for periodically outputting a signal (e.g., for each cycle) is formed in a program executed in the microcomputer 102, and an output signal obtained by this routine is output as a program running signal to the external WDT 101.

More specifically, when the program is normally run, the microcomputer 102 periodically outputs a program running signal, and the WDT 101 receives the program running signal as a reset signal. The WDT 101 stops its own counting operation on the basis of the reset signal. Therefore, the WDT 101 does not return a signal to the microcomputer 102. On the other hand, when outputting of a program running signal from the microcomputer 102 is interrupted by runaway of a microprogram or the like, the counting operation of the WDT 101 is not reset, and the counting operation of the WDT 101 is continued for a predetermined period of time. At this time, the WDT 101 outputs a signal in order to reset the microcomputor 102, thus initializing the hardwares of the microcomputer 102.

However, such a WDT cannot cope with all of a plurality of failure modes set in the microcomputer 102, and can cope with only few of the failure modes. Therefore, the failure detection system in which failure detection is performed by a reset operation may cause inconvenience.

As a countermeasure against the inconvenience of the failure detection system, a dual system for a microcomputer shown in FIG. 2 is devised.

In this dual system for the microcomputer, a microcomputer 103 and a microcomputer 104 input the same data and calculate by means of the same program. After the calculation, a comparator 105 compares an output from the microcomputer 103 with an output from the microcomputer 104. When the functions of the microcomputer 103 and the microcomputer 104 are normal, an output 1 from the microcomputer 103 and an output 2 from the microcomputer 104 are equal to each other. For this reason, a fail-safe signal and a warning signal are not output from the comparator 105, and the control is performed by the output 1 from the microcomputer 103.

On the other hand, when either of microcomputers 103 and 104 becomes abnormal, a comparison result from the comparator 105 represents an unequal state. When the comparison result represents an unequal state, the comparator 105 outputs a fail-safe signal and a warning signal which represent that the microcomputer 103 or 104 is abnormal to establish the safety of the control system.

In a failure detection system using the above dual system for the microcomputer, if this failure detection system has a digital control input and an error which is not accumulated, inconvenience is not caused. However, when the dual system is applied to vector control used in motor control for an electric vehicle, a detection sensitivity is not easily improved. In particular, when the dual system has an integration system arranged in the microcomputer of the dual system, the inconvenience is significant. This is because, although the same output is obtained by performing the same calculation by using the same input, when an analog input such as a torque command is used, the same amount of analog input cannot be easily input to the microcomputers 103 and 104. In addition, in the dual system including an internal integration system, the reliability of the least significant bit is degraded during A/D conversion for converting input analog data into digital data. When such an error or the like occurs in the least significant bit, it is not easily determined whether a resultant value obtained by the integration is reliable. Furthermore, when the motor is rotated at a high speed, a two-phase/three-phase converter and a current controller are operated at a high speed. For this reason, the corresponding two-phase/three-phase converter or the like cannot be easily controlled by the microcomputer.

SUMMARY OF THE INVENTION

The present invention has been made in consideration of the conventional problems, and has as its object to provide a fail-safe control apparatus for an electric vehicle driving motor which has high reliability for detection of a system failure and can be controlled by a microcomputer even if the electric vehicle driving motor is driven at a high speed.

In order to achieve the above object, the present invention provides a fail-safe control apparatus for an electric vehicle driving motor, comprising: first control means for calculating and outputting an absolute value of amplitude and a phase angle of a motor primary current and a motor primary frequency on the basis of an accelerator signal corresponding to the position of an accelerator and a speed signal and outputting a torque current and an exciting current serving as results obtained in the middle of the calculation; pulse width modulation control means for receiving and two-phase/three-phase-converting the torque current and the exciting current, and, on the basis of the converted three-phase torque and exciting currents and a three-phase current for driving and controlling the drive motor, outputting a PWM signal for controlling the drive motor by a pulse width; torque estimation means for receiving the same three-phase current as that of the three-phase current input to the pulse width control means; and three-phase/two-phase-converting the three-phase current by using the phase angle output from the first control means to calculate and output an estimation value of the torque current and an estimation value of the exciting current; second control means for calculating and outputting an absolute value of amplitude and a phase angle of a motor primary current and a motor primary frequency on the basis of an accelerator signal corresponding to the position of an accelerator and a speed signal; and outputting a torque current and an exciting current serving as results obtained in the middle of the calculation; first comparison means for comparing the absolute value of amplitude and the phase angle of the motor primary current and the motor primary frequency which are output from the first control means with the absolute value of amplitude and the phase angle of the motor primary current and the motor primary frequency which are output from the second control means, respectively, and outputting a fail-safe signal when the first comparison means determines that the magnitudes of the differences are kept to be not less than a predetermined value for a predetermined period of time; and second comparison means for comparing the estimation value of the torque current and the estimation value of the exciting current which are output from the torque estimation means with the torque current and the exciting current which are output from the second control means, respectively, and outputting a fail-safe signal when the second comparison means determines that the magnitudes of the differences are kept to be not less than a predetermined value for a predetermined period of time.

As described above, according to the present invention, in the fail-safe control apparatus for the electric vehicle driving motor, in order to detect an integration error of a motor primary frequency obtained by the pulse width modulation control means, the torque estimation means calculates the estimation value of a torque current and the estimation value of an exciting current serving as the reference values of the torque current and the exciting current in such a manner that a three-phase current input to the pulse width modulation control means is three-phase/two-phase-converted by using a phase angle output from the first control means.

In order to detect an error of a dual system, the first comparison means compares the absolute value of amplitude and the phase angle of a motor primary current and a motor primary frequency which are output from the first control means with the absolute value of amplitude and the phase angle of the motor primary current and a motor primary frequency which are output from the second control means, respectively. The first comparison means determines that the error of the dual system occurs when it is determined that the differences are kept equal to or larger than a predetermined value for a predetermined period of time, so that the first comparison means outputs a fail-safe signal.

On the other hand, in order to detect an integration error of a motor primary frequency obtained by the pulse width modulation control means, the second comparison means compares the estimation values of the torque and exciting currents serving as the reference values output from the torque estimation means with a torque and exciting currents output from the second control means, respectively. The second comparison means determines that an integration error of the motor primary frequency caused by the pulse width modulation control means occurs when it is determined that the differences are kept equal to or larger than a predetermined value for a predetermined period of time, so that the second comparison means outputs a fail-safe signal. Therefore, reliability for detection of a system failure can be improved, and the fail-safe control apparatus can be controlled by a microcomputer or the like even if the motor is driven at a high speed.

According to a preferred embodiment of the present invention, the first control means converts the absolute value of amplitude and the phase angle of the motor primary current calculated on the basis of the accelerator signal and the speed signal into an absolute value and a phase angle in a polar form by orthogonal-polar form conversion and then outputs the absolute value and the phase angle in the polar form.

According to another preferred embodiment of the present invention, the first control means calculates a slip frequency on the basis of the accelerator signal, calculates a motor angular velocity on the basis of the slip frequency of the speed signal, and calculates the motor primary frequency in the polar form on the basis of a sum of the motor angular velocity and the slip frequency to output the motor primary frequency.

According to still another preferred embodiment of the present invention, the first control means is a microcomputer.

According to still another preferred embodiment of the present invention, the first control means receives the speed signal from speed detection means.

According to still another preferred embodiment of the present invention, the speed control means is constituted as a dual system.

According to still another preferred embodiment of the present invention, the pulse width modulation control means comprises: two-phase/three-phase conversion means for integrating the motor primary frequency; calculating a sum of the integration result and the phase angle to calculate an electrical angle of the motor; causing a trigonometric function generation circuit to calculate sin θ on the basis of the electrical angle; and multiplying the sin θ by the absolute value of the amplitude to obtain a three-phase current analog command; current feedback means for calculating a difference between the three-phase current analog command and a three-phase current, detected by a current sensor, for driving and controlling the drive motor; performing PI compensation to the result; and outputting, as a current error signal, the result subjected to the PI compensation; and PWM generation means for comparing a phase of the current error signal with a phase of a chopping wave having a carrier frequency and generated by a chopping wave generation unit and a carrier peak value calculation unit in the first control unit to generate a PWM signal.

The nature, principle and utility of the invention will become more apparent from the following detailed description when read in conjunction with the accompanying drawings.

DESCRIPTION OF THE PREFERRED EMBODIMENT

An embodiment of the present invention will be described below with reference to the accompanying drawings.

Figure 1:
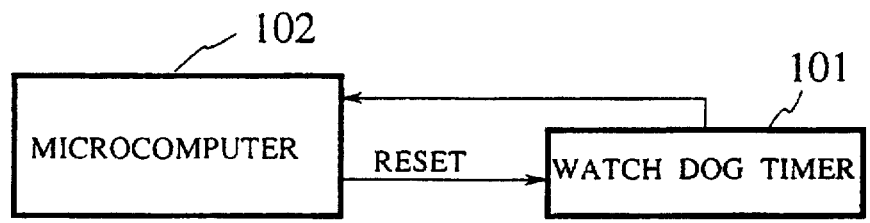
FIG. 1 is a block diagram showing a conventional failure detection system.
Figure 2:
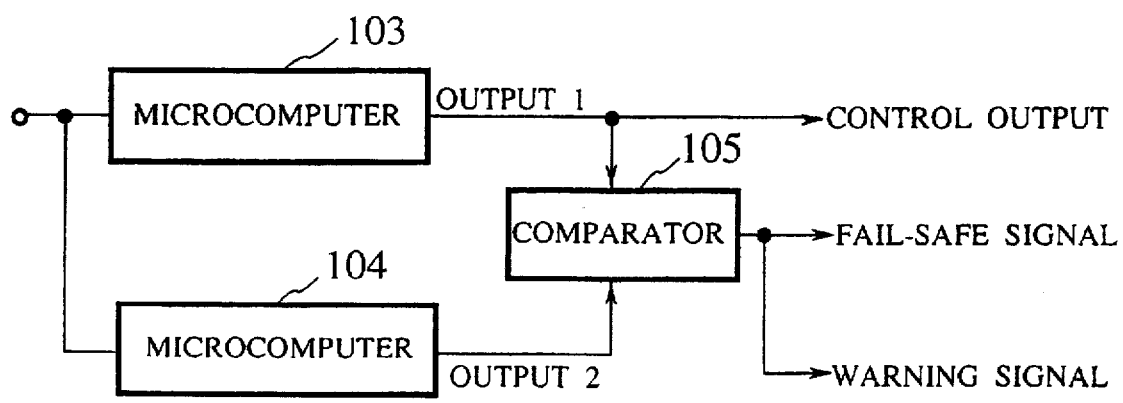
FIG. 2 is a block diagram showing a conventional failure detection system which employs a dual system.
Figure 3:
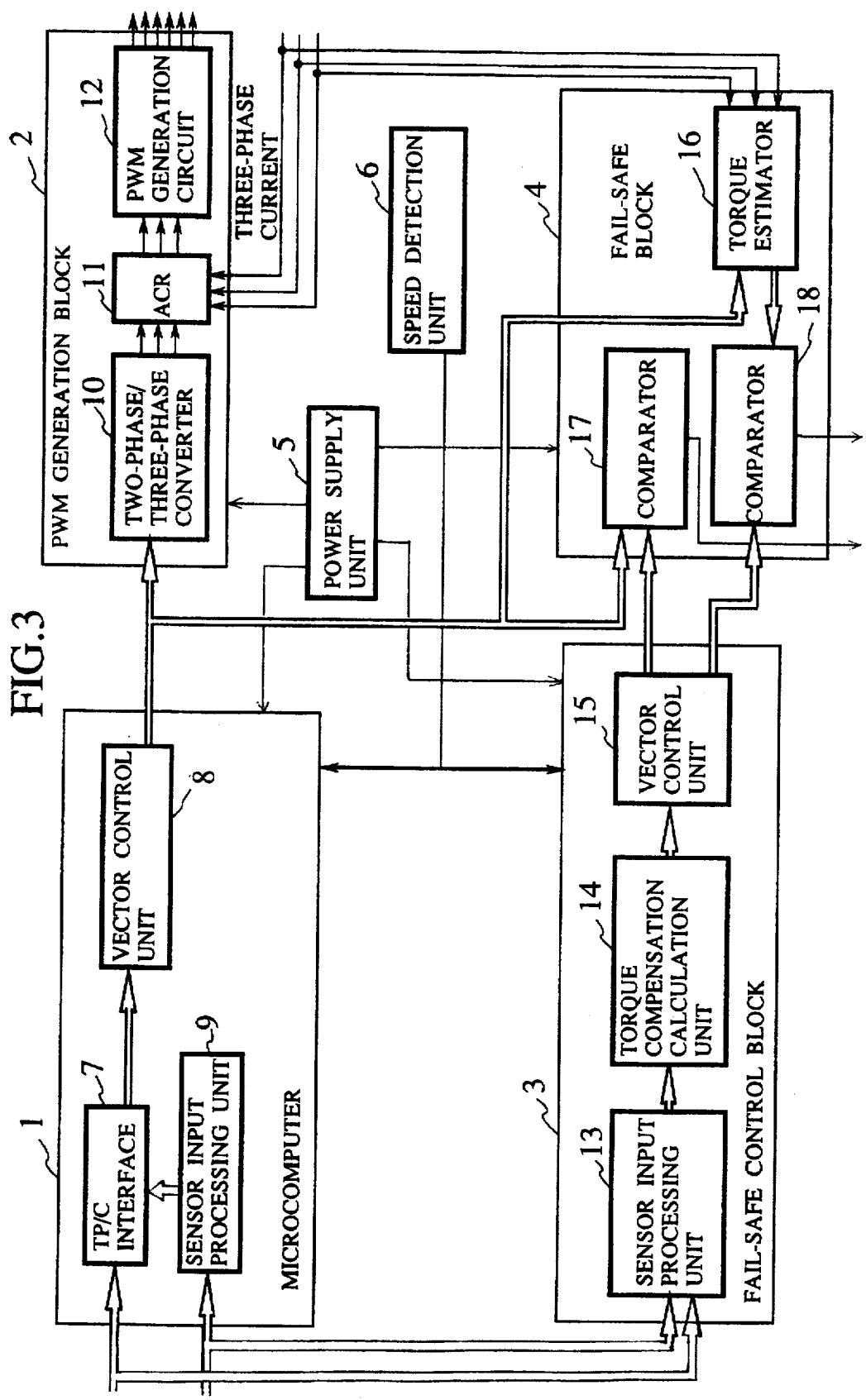
FIG. 3 is a block diagram showing the arrangement of a fail-safe control apparatus for an electric vehicle driving motor according to an embodiment of the present invention.

FIG. 3 is a block diagram showing a fail-safe control apparatus for an electric vehicle driving motor according to an embodiment of the present invention.

This fail-safe control apparatus for an electric vehicle driving motor is constituted by a microcomputer 1, a PWM (Pulse Width Modulation) generation block 2, a fail-safe control block 3, a fail-safe block 4, a power supply unit 5, and a speed detection unit 6.

The microcomputer 1 comprises a TP/C interface 7, a vector control unit 8, and a sensor input processing unit 9. The TP/C interface 7 functions to receive an accelerator signal into the microcomputer 1 and to output the accelerator signal to the vector control unit 8.

The vector control unit 8 calculates the absolute value of amplitude and the phase angle of the motor primary current serving as digital data on the basis of the accelerator signal input from the TP/C interface 7 and a speed signal input from the speed detection unit 6, and performs orthogonal-polar form conversion (to be described later) to the absolute value and the phase angle to convert them into values in a polar form. The vector control unit 8 outputs the absolute value and the phase angle of the amplitude of the motor primary current which are converted into the values in the polar form to a two-phase/three-phase converter 10 (to be described later) and a comparator 17, and outputs the phase angle to a torque estimator 16. The vector control unit 8 calculates a slip frequency on the basis of the accelerator signal and calculates a motor angular velocity on the basis of the slip frequency and the speed signal. The vector control unit 8 calculates a motor primary frequency in the polar form on the basis of the sum of the motor angular velocity and the slip frequency to output the motor primary frequency to the two-phase/three-phase converter 10 (to be described later) and the comparator 17. In addition, the vector control unit 8 outputs a torque current and an exciting current as intermediate results of the calculation to the two-phase/three-phase converter 10 (to be described later). The sensor input processing unit 9 receives signals for forming a torque command signal through various signal interfaces (not shown) to perform processing. The sensor input processing unit 9 A/D-converts a drive motor (not shown), an IGBT temperature, a battery voltage, and an accelerator opening degree to perform various digital control input processing.

The PWM generation block 2 comprises the two-phase/three-phase converter 10, a current feedback circuit 11, and a PWM generation circuit 12. The PWM generation block 2 generates a three-phase current analog command on the basis of the digital data consisting of the absolute value of the amplitude of a motor primary current in the polar form (to be described later) and the motor primary frequency which are output from the vector control unit 8 of the microcomputer 1, thereby generating a current control signal and a PWM signal.

The two-phase/three-phase converter 10 integrates the motor primary frequency on the basis of the digital data consisting of the absolute value of amplitude and the phase angle of the motor primary current in the polar form and the motor primary frequency which are output from the vector control unit 8, and calculates an electrical angle θ of the motor on the basis of the sum of the integration result and the phase angle. The two-phase/three-phase converter 10 causes a trigonometric function generation circuit (not shown) to generates sin θ on the basis of the motor electrical angle θ, and multiplies sin θ by the absolute value of the amplitude of the motor primary current to calculate three-phase analog commands $I_u$, $I_v$, and $I_w$ (to be described later). Thus, in the illustrative example provided hereinbelow, the two-phase/three-phase converter provides the commands $I_u$, $I_v$, and $I_w$ based on $i_q$ and $i_d$.

The current feedback circuit (to be referred to as an ACR hereinafter) 11 calculates the differences between the three-phase current analog commands output from the two-phase/three-phase converter 10 and a three-phase current, detected by a current sensor (out of the drawing), for driving and controlling an electric vehicle driving motor (not shown), performs PI compensation to the differences, and outputs the resultant values to the PWM generation circuit 12 as current error signals. The PWM generation circuit 12 compares the phases of the current error signals output from the ACR 11 with the phase of a chopping wave having a carrier frequency and obtained by a carrier peak value calculation (not shown) of the vector control unit 8 and chopping wave generation in the PWM generation block 2 to generate a PWM signal. The PWM generation circuit 12 stops its outputting operation in response to a command from the fail-safe block 4. In addition, the PWM generation circuit 12, on the basis of the generated PWM signal, generates an IGBT drive signal obtained by subtracting a dead time for preventing a simultaneous ON state and supplies the IGBT drive signal to a three-phase bridge (not shown).

The fail-safe control block 3 comprises a sensor input processing unit 13, a torque compensation calculation unit 14, and a vector control unit 15. The fail-safe control block 3 receives inputs from various sensors to perform calculation corresponding to torque compensation calculation performed in the TP/C interface 7, and outputs them to the fail-safe block 4 as comparing signals. The sensor input processing unit 13 performs processing like the TP/C interface 7 in such a manner that a signal for forming a torque command signal is supplied to the fail-safe control block 3. The sensor input processing unit 13 A/D-converts the drive motor (not shown), the IGBT temperature, the battery voltage, and the accelerator opening degree to perform various digital control input processing. The torque compensation calculation unit 14 performs calculation corresponding to torque compensation calculation based on the accelerator signal calculated in the TP/C interface 7. Although the vector control unit 15 performs the same calculation as that of the vector control unit 8, the vector control unit 15 basically performs calculation in the same control cycle as that of the torque compensation calculation unit 14. Like the vector control unit 8 of the microcomputer 1, the vector control unit 15 calculates the absolute value of amplitude and the phase angle of the motor primary current and the motor primary frequency to output the absolute value of amplitude and the phase angle of the motor primary current and the motor primary frequency in the polar form to the comparator 17 (to be described later). The vector control unit 15 outputs a torque current and an exciting current serving as results obtained in the middle of the calculation to the comparator 18 (to be described later).

The fail-safe block 4 comprises the torque estimator 16, the comparator 17, and the comparator 18. The fail-safe block 4 compares an output from the vector control unit 8 of the microcomputer 1 with an output from the vector control unit 15 of the fail-safe control block 3, and compares the torque current and the exciting current serving as the results obtained in the middle of the calculation and output from the vector control unit 8 with the estimation values of the torque current and the exciting current. When the comparison results continue to be equal to or larger than a predetermined value for a predetermined period of time, the fail-safe block 4 outputs a fail-safe signal.

More specifically, the torque estimator 16 implements a three-phase/two-phase-conversion on the same three-phase current as that input to the ACR 11 of the PWM generation block 2 by a three-phase/two-phase conversion expression (to be described later) using the phase angle output from the vector control unit 8 of the microcomputer 1 to calculate the estimation values of the torque current and the exciting current and outputs them to the comparator 18. The comparator 17 digitally compares the absolute value of amplitude and the phase angle of the motor primary current in the polar form and the motor primary frequency which are output from the vector control unit 8 of the microcomputer 1 with the absolute value of amplitude and the phase angle of the motor primary current in the polar form and the motor primary frequency which are output from the vector control unit 15, respectively. When the comparator 17 determines that the magnitudes of the differences serving as the comparison results remain equal to or larger than a value having a predetermined number of bits for a predetermined period of time, the comparator 17 outputs a fail-safe signal. The comparator 18 compares the torque current and the exciting current serving as the intermediate results of the calculation and output from the vector control unit 15 of the fail-safe control block 3 with the estimation values of the torque current and the exciting current serving as outputs from the torque estimator 16, respectively. When the comparator 18 determines that the magnitudes of the differences serving as the comparison results continue to be equal to or larger than a predetermined value for a predetermined period of time, the comparator 18 outputs a fail-safe signal. Note that the predetermined values in the comparators 17 and 18 are dependent on a drive motor or the like to be applied. In addition, the reason why the differences are detected for the predetermined period of time is that the differences can be discriminated from noise or the like which is suddenly generated.

The power supply unit 5 generates 5 V for a CPU and a digital IC and ±15 V for an analog IC from 12 V. The speed detection unit 6 causes the dual system for a rotation sensor (to be described later) to detect a speed signal, and outputs the speed signal to the microcomputer 1 and the fail-safe control block 3.

In this case, the control principle of an induction motor controlled by vector control will be described below with reference to FIG. 4. A torque current calculation 19 and an exciting-response/exciting-current calculation 20 calculate an exciting current $i_s^*$ and a torque current $i_d^*$ on the basis of a magnetic flux command $\phi_r^*$ and a torque command T* to output a command to a PWM inverter 28. At this time, the relationship between the current and magnetic flux of the induction motor and the output torque of the induction motor are described below.

$$\dot{\phi}_{dr} = \frac{MR_r}{L_r} i_{ds} - \frac{R_r}{L_r} \phi_{dr} + \omega_{se}\phi_{qr} \quad (1)$$

$$\dot{\phi}_{qr} = \frac{MR_r}{L_r} i_{qs} - \frac{R_r}{L_r} \phi_{qr} + \omega_{se}\phi_{dr} \quad (2)$$

$$Te = \frac{RM}{L_r}(\phi_{dr} \cdot i_{qs} - \phi_{qr} \cdot i_{ds}) \quad (3)$$

where M is a mutual inductance; $R_r$, a rotor resistance; $L_r$, a rotor self-inductance; $\omega_{se}$, a slip frequency; p, a polar logarithm; subscripts d and q, the components of a d–q axis on an orthogonal coordinate rotated at a power supply frequency ω; subscript r, various amounts of a rotor; subscript s, various amounts of a stator; and $T_e$, an output torque.

When the following conditions are applied to the above expressions, $$\phi_{qr}=0, \dot{\phi}_{qr}=0$$

expressions (1) to (3) are converted into the following expressions:

$$\dot{\phi}_{dr} = -\frac{R_r}{L_r} \phi_{dr} + \frac{R_r}{L_r} M \cdot i_{ds} \quad (4)$$

$$\omega_{se} = \frac{MR_r}{L_r} \cdot \frac{i_{qs}}{\phi_{dr}} \quad (5)$$

$$Te = \frac{PM}{L_r} \phi_{dr} \cdot i_{qs} \quad (6)$$

Therefore, when the slip frequency $\omega_{se}$ is controlled by expression (5), a torque and a rotor magnetic flux are expressed by expressions (6) and (4), respectively.

In this case, when $i_{qs}$, $i_{ds}$, and $\phi_{dr}$ are rewritten by a torque current $i_q$, an exciting current $i_\phi$, and $\phi_r$, respectively, expression (5) is converted into expression (7):

$$\omega_{se} = \frac{MR_r}{L_r} \cdot \frac{i_q}{\phi_r} \quad (7)$$

Figure 4:
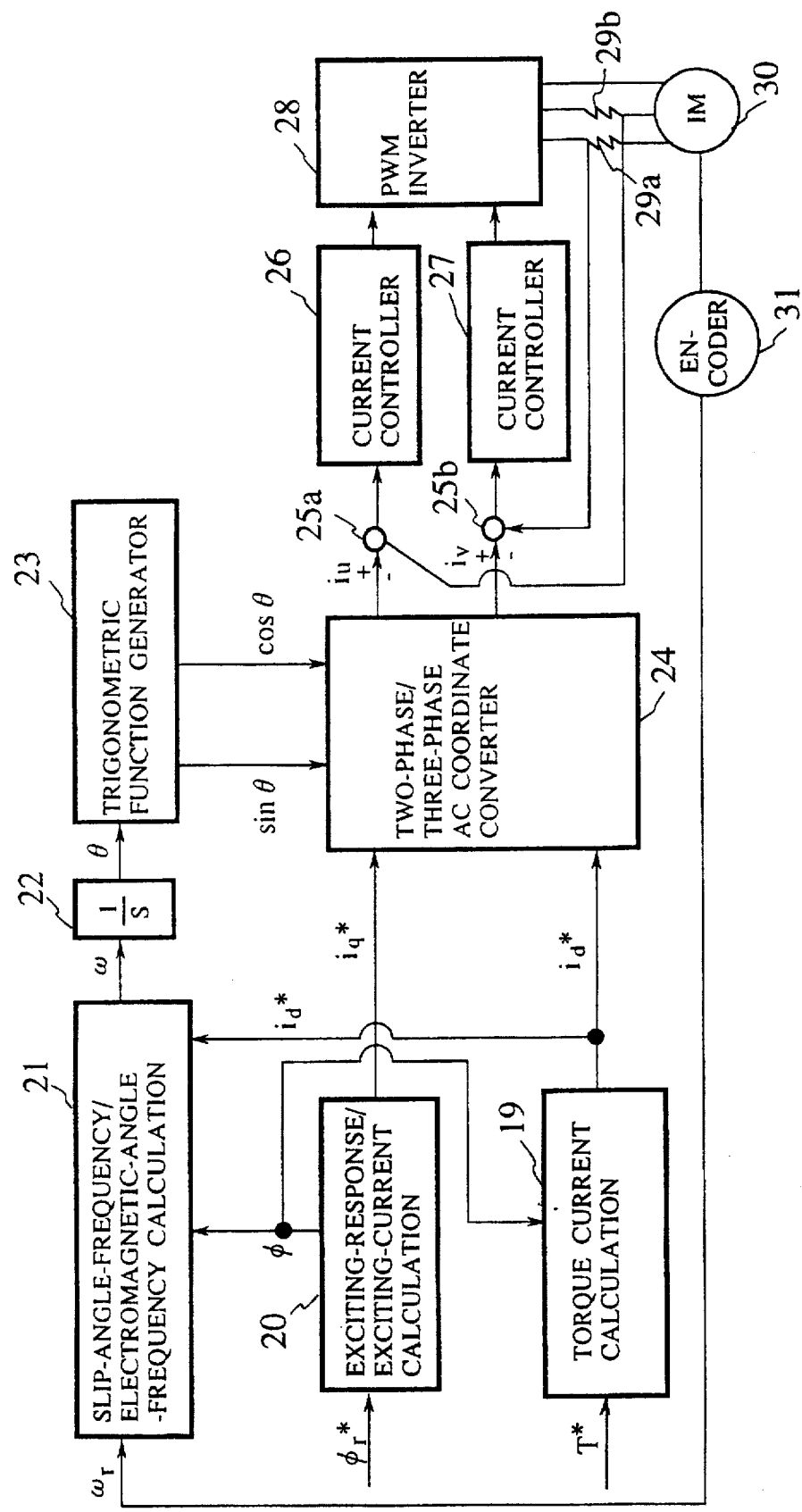
FIG. 4 is a block diagram showing the arrangement of a controller of an induction motor controlled by vector control.

Therefore, in FIG. 4, the slip angle frequency calculation in the slip-angle-frequency/electromagnetic-angle-frequency calculation 21 is performed as described above. The electromagnetic angle frequency calculation in the slip-angle-frequency/electromagnetic-angle-frequency calculation 21 is performed as:

$$\omega=\omega_{se}+\omega_r\cdot P \quad (8)$$

In addition, expression (9) is derived from expression (4).

$$i_\phi = \frac{L_r}{MR_r}\left(\dot{\phi}_r + \frac{R_r}{L_r} \phi_r\right) \quad (9)$$

Assume that a target magnetic flux response $\phi_r^*$ has first-order lag characteristics. $\phi_r$ and $\dot{\phi}_r$ are calculated with respect to $\phi_r^*$. For this reason, by using $\phi_r$ and $\dot{\phi}_r$, $i_\phi$ can be calculated according to expression (9).

Furthermore, expression (10) is derived from expression (6).

$$i_q = \frac{L_r}{PM} \cdot \frac{T^*}{\phi_r} \quad (10)$$

Therefore, a torque target value T* and $\phi_r$ are input, and $i_q$ is calculated according to expression (10). The above is the outline of vector control.

Since $i_q$ and $i_d$ obtained as described above are quantities on an orthogonal axis rotated at a power supply frequency and cannot be directly used as currents flowing in the motor, $i_q$ and $i_d$ are two-phase/three-phase-converted by a two-phase/three-phase AC coordinate converter 24.

For this purpose, a primary frequency ω is integrated by an integrator 22 so as to obtain a phase angle θ, and a trigonometric function generator 23 calculates trigonometric functions sin θ and cos θ on the basis of the phase angle θ.

$$\begin{bmatrix} v_{us}^* \\ v_{vs}^* \end{bmatrix} = \begin{bmatrix} \sqrt{\frac{2}{3}} & 0 \\ -\frac{1}{\sqrt{6}} & \frac{1}{\sqrt{6}} \end{bmatrix} \begin{bmatrix} \cos\theta & -\sin\theta \\ \sin\theta & \cos\theta \end{bmatrix} \begin{bmatrix} v_{\gamma s}^* \\ v_{\delta s}^* \end{bmatrix}$$

$$= \sqrt{\frac{2}{3}} \begin{bmatrix} \sin\left(\theta+\frac{\pi}{2}\right) & -\sin\theta \\ -\sin\left(\theta+\frac{5}{6}\pi\right) & \sin\left(\theta+\frac{\pi}{3}\right) \end{bmatrix} \begin{bmatrix} v_{\gamma s}^* \\ v_{\delta s}^* \end{bmatrix}$$

$$v_{ws}^* = -v_{us}^* - v_{vs}^*$$

-continued $$\begin{bmatrix} i_{\gamma s} \\ i_{\delta s} \end{bmatrix} = \begin{bmatrix} \cos\theta & -\sin\theta \\ -\sin\theta & \cos\theta \end{bmatrix} \begin{bmatrix} \sqrt{\frac{3}{2}} & 0 \\ \frac{1}{\sqrt{2}} & \sqrt{2} \end{bmatrix} \begin{bmatrix} i_{us} \\ i_{vs} \end{bmatrix}$$

$$= \sqrt{2} \begin{bmatrix} \sin\left(\theta + \frac{\pi}{3}\right) & \sin\theta \\ -\sin\left(\theta + \frac{5}{6}\pi\right) & \sin\left(\theta + \frac{\pi}{2}\right) \end{bmatrix} \begin{bmatrix} i_{us} \\ i_{vs} \end{bmatrix}$$

On the basis of the above two-phase/three-phase conversion expression, three-phase AC amounts $i_u$ and $i_v$ are calculated. A current control inverter incorporated with a feedback system controls three-phase currents $i_u$, $i_v$, and $i_w$ on the basis of currents detected by current sensors 29a and 29b from the three-phase output of the PWM inverter 28.

Note that the motor angle frequency $\omega_r$ obtained from the three-phase output of the PWM inverter 28 through an IM 30 and an encoder 31 is input to the slip-angle-frequency/electromagnetic-angle-frequency calculation 21.

The above is the outline of the vector control inverter.

Figure 5:
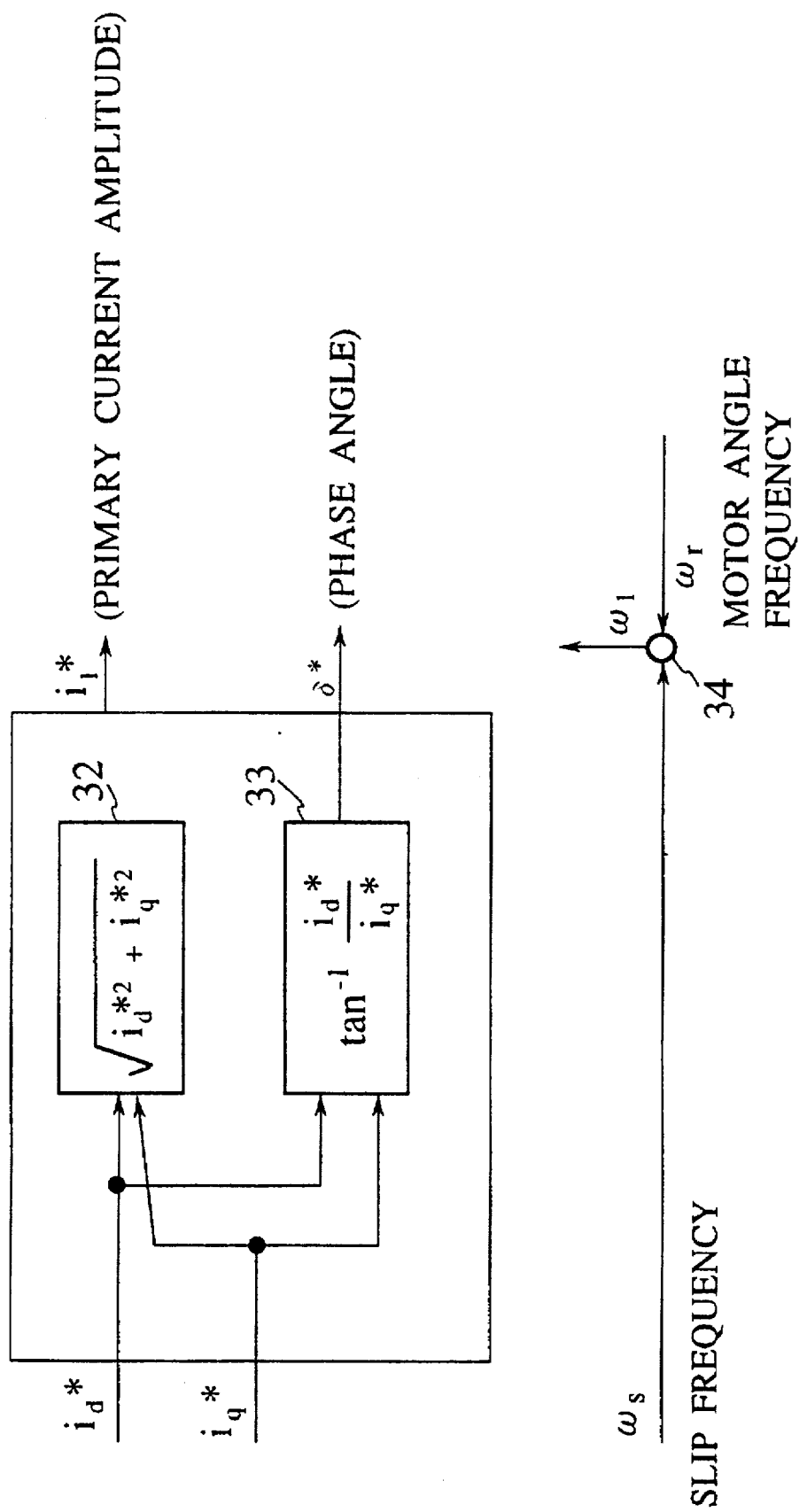
FIG. 5 is a view for explaining orthogonal-polar form conversion.

Orthogonal-polar form conversion will be described below with reference to FIG. 5.

An amplitude $i_1^*$ of a motor primary current in a polar form can be calculated by an expression 32 which is the square root of the sum of the square of the amplitude $i_q^*$ and the square of a phase angle $i_d^*$ of a primary current in an orthogonal form. A phase angle $\delta^*$ in the polar form can be calculated by an expression 33 which is the arc tangent of (phase angle $i_d^*$)/(primary current amplitude $i_q^*$). The motor primary frequency $\omega_1$ can be calculated as the sum of a slip frequency $\omega_s^*$ and a motor angle frequency $\omega_r$. In this manner, an absolute value $\delta$ of the amplitude of the motor primary current converted into the value in the polar form and the motor primary frequency $\omega_1$ are input to the two-phase/three-phase converter 10 of the PWM generation block 2.

The operation of this embodiment will be described below.

The vector control unit 8 calculates digital data consisting of the absolute value of amplitude and the phase angle of a motor primary current in a polar form and a motor primary frequency on the basis of an accelerator signal input from the TP/C interface 7 and a speed signal input form the speed detection unit 6. Upon completion of the calculation, the vector control unit 8 outputs the absolute value of amplitude and the phase angle of the motor primary current in the polar form and the motor primary frequency to the two-phase/three-phase converter 10 and the comparator 17 and outputs the phase angle to the torque estimator 16. In addition, the vector control unit 8 outputs a torque current and an exciting current serving as intermediate results of the calculation to the two-phase/three-phase converter 10.

The two-phase/three-phase converter 10 integrates the motor primary frequency on the basis of the digital data consisting of the absolute value of amplitude and the phase angle of the motor primary current in the polar form and the motor primary frequency which are output from the vector control unit 8, and calculates the sum of the integration result and the phase angle to calculate the motor electrical angle θ. The two-phase/three-phase converter 10 causes a trigonometric function generation circuit (not shown) to generate sin θ on the basis of the motor electrical angle θ, and multiplies sin θ by the absolute value of amplitude of the motor primary current to calculate three-phase current analog commands $I_u$, $I_v$, $I_w$. Upon completion of the calculation, the ACR 11 calculates the differences between the output three-phase current analog commands and a three-phase current, detected by a current sensor (out of the drawing), for driving and controlling an electric vehicle driving motor (not shown), performs PI compensation to the differences, and outputs the resultant values to the PWM generation circuit 12 as current error signals. The PWM generation circuit 12 compares the phases of the current error signals output from the ACR 11 with the phase of a chopping wave having a carrier frequency to generate a PWM signal.

The sensor input processing unit 13 performs processing like the TP/C interface 7 in such a manner that a signal for forming a torque command signal is supplied to the fail-safe control block 3. The torque compensation calculation unit 14 performs calculation corresponding to torque correction calculation based on an accelerator signal calculated in the TP/C interface 7. Like the vector control unit 8 of the microcomputer 1, the vector control unit 15 calculates the absolute value of amplitude and the phase angle of the motor primary current and the motor primary frequency to output them to the comparator 17. The vector control unit 15 outputs a torque current and an exciting current serving as intermediate results of the calculation to the comparator 18.

The torque estimator 16 three-phase/two-phase-converts the same three-phase current as that input to the ACR 11 by a three phase/two-phase conversion expression using the phase angle output from the vector control unit 8 of the microcomputer 1 to calculate the estimation values of the torque current and the exciting current and outputs them to the comparator 18.

The comparator 17 digitally compares the absolute value of amplitude and the phase angle of the motor primary current and the motor primary frequency which are output from the vector control unit 8 of the microcomputer 1 with the absolute value of amplitude and the phase angle of the motor primary current and the motor primary frequency which are output from the vector control unit 15, respectively. When the comparator 17 determines that the magnitudes of the differences serving as the comparison results are kept to be equal to or larger than a value having a predetermined number of bits for a predetermined period of time, the comparator 17 outputs a fail-safe signal. The comparator 18 compares the torque current and the exciting current serving as the outputs from the vector control unit 15 of the fail-safe control block 3 with the estimation values of the torque current and the exciting current serving as outputs from the torque estimator 16, respectively. When the comparator 18 determines that the magnitudes of the differences serving as the comparison results are kept to be equal to or larger than a predetermined value for a predetermined period of time, the comparator 18 outputs a fail-safe signal.

In this manner, a failure in the microcomputer 1 or the fail-safe control block 3 can be detected on the basis of the comparison result of the comparator 17, and a failure of the two-phase/three-phase converter 10 or the like in the PWM generation block 2 can also be detected on the basis of the comparison result of the comparator 18. In addition, the abnormality of torque generation can be detected at a high speed even if the motor is rotated at a low speed. Therefore, reliability for detection of the failure of a fail-safe control system of an electric vehicle driving motor can be improved. Even if the electric vehicle driving motor is driven at a high speed, the fail-safe control apparatus can be controlled by a microcomputer.

Figure 6:
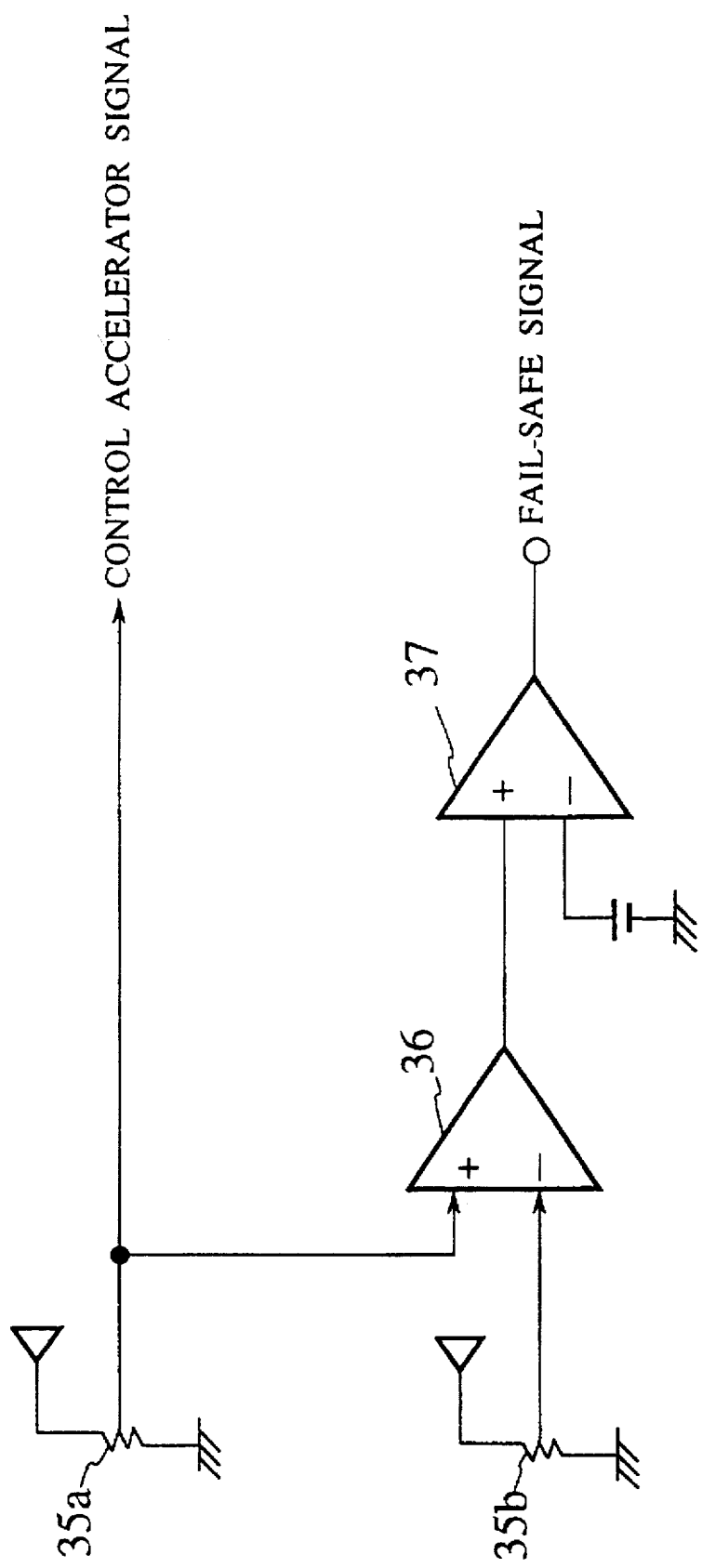
FIG. 6 is a circuit diagram showing a dual system for an accelerator sensor.

A dual system for the accelerator signal will be described below with reference to the circuit diagram in FIG. 6.

The dual system for an accelerator sensor comprises an accelerator sensor 35a, an accelerator sensor 35b, a differential amplifier 36, and a comparator 37. An accelerator signal detected by the accelerator sensor 35a is output as a control accelerator signal and input to one input terminal of the differential amplifier 36. On the other hand, an accelerator signal detected by the accelerator sensor 35b is input to the other input terminal of the differential amplifier 36. The output terminal of the differential amplifier 36 is connected to one input terminal of the comparator 37. The output terminal of the differential amplifier 36 outputs the deviation between the accelerator signal from the accelerator sensor 35a and the accelerator signal from the accelerator sensor 35b. The other input terminal of the comparator 37 is connected to a reference voltage, and the comparator 37 outputs a fail-safe signal when the reference voltage is different from the output from the differential amplifier 36.

Figure 7:
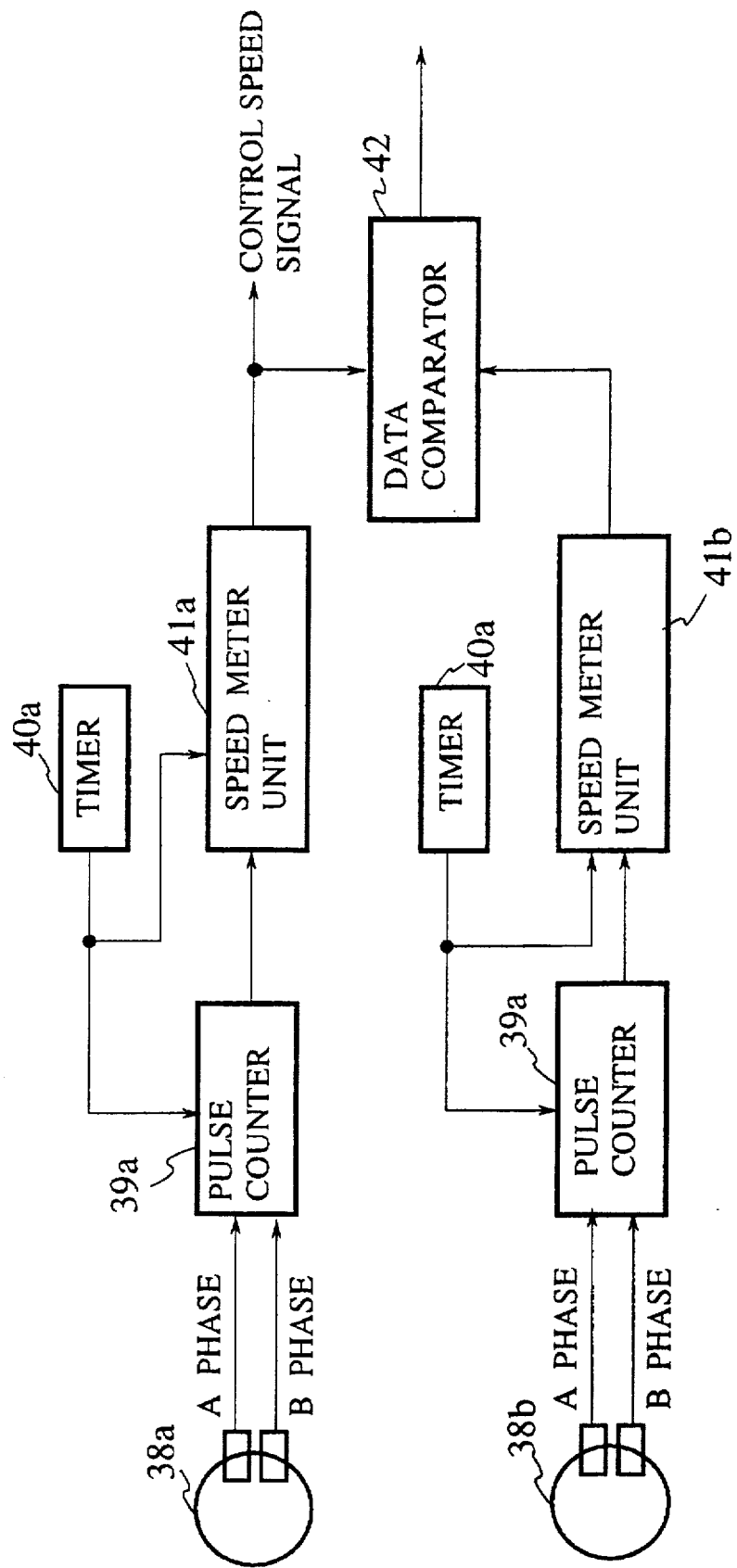
FIG. 7 is a circuit diagram showing a dual system for a rotation sensor.

A dual system for a rotation sensor will be described below with reference to the circuit diagram in FIG. 7.

The dual system for the rotation sensor comprises: a system having a rotation sensor 38a, a pulse counter 39a, a timer 40a, and a speed meter unit 41a; a system having a rotation sensor 38b, a pulse counter 39b, a timer 40b, and a speed meter unit 41b; and a data comparator 42. A-phase and B-phase pulse signals which are detected by the rotation sensor 38a and are shifted from each other by 90° are input to the pulse counter 39a. These pulse signals are kept counted until time indicated by the timer 40a, and a count value is output to the speed meter unit 41a. The speed meter unit 41a measures a speed signal on the basis of the count value of the pulse signals. The speed meter unit 41a outputs the speed signal to the data comparator 42 and outputs the speed signal as a control speed signal.

The system constituted by the rotation sensor 38b and the like is operated as described above, and a speed signal measured by the speed meter unit 41b is output to the data comparator 42. The data comparator 42 outputs a fail-safe signal when the speed signals input from the speed meter unit 41a and the speed meter unit 41b do not coincide with each other.

The pulse counters 39a and 39b, the timers 40a and 40b, the speed meter units 41a and 41b, and the data comparator 42 in the dual system for the rotation sensor constitute the speed detection unit 6 in FIG. 3.

As has described above, since the accelerator sensors and rotation sensors are constituted as dual systems, the reliability of the output signals from the accelerator sensors 35a and 35b and the rotation sensors 38a and 38b can be improved.

It should be understood that many modifications and adaptations of the invention will become apparent to those skilled in the art and it is intended to encompass such obvious modifications and changes in the scope of the claims appended hereto.

What is claimed is:

1. A fail-safe control apparatus for an electric vehicle driving motor, comprising:

first control means for
calculating and outputting an absolute value of amplitude and a phase angle of a motor primary current and a motor primary frequency in response to an accelerator signal corresponding to the position of an accelerator and a speed signal representing a speed of the vehicle driving motor; and
outputting a torque current and an exciting current which are intermediate results of the calculation;

pulse width modulation control means for
receiving and two-phase/three-phase-converting the torque current and the exciting current; and
in response to the converted three-phase torque and exciting currents and a three-phase current for driving and controlling the drive motor, outputting a PWM signal for controlling said drive motor by a pulse width;

torque estimation means for
receiving the same three-phase current as that of said three-phase current input to said pulse width modulation control means; and
three-phase/two-phase-converting the three-phase current by using the phase angle output from said first control means to calculate and output an estimation value of the torque current and an estimation value of the exciting current;

second control means for
calculating and outputting an absolute value of amplitude and a phase angle of a motor primary current and a motor primary frequency in response to an accelerator signal corresponding to the position of an accelerator and a speed signal representing a speed of the vehicle driving motor; and
outputting a torque current and an exciting current which are intermediate results of the calculation;

first comparison means for
comparing the absolute value of amplitude and the phase angle of the motor primary current and the motor primary frequency which are output from said first control means with the absolute value of amplitude and the phase angle of the motor primary current and the motor primary frequency which are output from said second control means, respectively; and
outputting a fail-safe signal when said first comparison means determines that magnitudes of differences between the outputs from said first and second control means have values not less than a predetermined value for a predetermined period of time; and second comparison means for
comparing the estimation value of the torque current and the estimation value of the exciting current which are output from said torque estimation means with the torque current and the exciting current which are output from said second control means, respectively; and
outputting a fail-safe signal when the second comparison means determines that the magnitudes of the differences have values not less than a predetermined value for a predetermined period of time.

2. A fail-safe control apparatus for an electric vehicle driving motor according to claim 1, wherein:

said first control means converts the absolute value of amplitude and the phase angle of the motor primary current calculated in response to said accelerator signal and said speed signal into an absolute value and a phase angle in a polar form by orthogonal-polar form conversion and then outputs the absolute value and the phase angle in the polar form.

3. A fail-safe control apparatus for an electric vehicle driving motor according to claim 1, wherein:

said first control means calculates a slip frequency in accordance with said accelerator signal, calculates a motor angular velocity in accordance with the slip frequency of said speed signal, and calculates the motor primary frequency in the polar form in accordance with a sum of the motor angular velocity and the slip frequency to output the motor primary frequency.

4. A fail-safe control means for an electric vehicle driving motor according to claim 1, wherein:

said first control means is a microcomputer.

5. A fail-safe control apparatus for an electric vehicle driving motor according to claim 1, wherein:

said first control means receives said speed signal from speed detection means.

6. A fail-safe control apparatus for an electric vehicle driving motor according to claim 5, wherein:

said speed control means is constituted as a dual system.

7. A fail-safe control apparatus for an electric vehicle driving motor according to claim 1, wherein:

said pulse width modulation control means comprises:

two-phase/three-phase conversion means for integrating said motor primary frequency;

calculating a sum of the integration result and the phase angle to calculate an electrical angle θ of the motor;

causing a trigonometric function generation circuit to calculate sin θ in accordance with the electrical angle θ; and multiplying sin θ by said absolute value of the amplitude to obtain a three-phase current analog command;

current feedback means for calculating a difference between said three-phase current analog command and a three-phase current, detected by a current sensor, for driving and controlling the drive motor;

performing PI compensation to the result; and outputting, as a current error signal, the result subjected to the PI compensation; and PWM generation means for comparing a phase of said current error signal with a phase of a chopping wave having a carrier frequency and generated by a chopping wave generation unit and a carrier peak value calculation unit in said first control unit to generate a PWM signal.

8. A fail-safe control apparatus for an electric vehicle driving motor, comprising:

first control means for calculating and outputting a first absolute value of amplitude and a first phase angle of a motor primary current and a first motor primary frequency in accordance with an accelerator signal corresponding to the position of an accelerator and a speed signal representing a speed of the vehicle driving motor; and outputting a first torque current and a first exciting current as intermediate results of the calculation;

pulse width modulation control means for receiving and two-phase/three-phase-converting the first torque current and the first exciting current; and in accordance with the converted three-phase torque and exciting currents and a three-phase current for driving and controlling the drive motor, outputting a PWM signal for controlling said drive motor by a pulse width;

torque estimation means for receiving the same three-phase current as that of said three-phase current input to said pulse width modulation control means; and three-phase/two-phase-converting the three-phase current by using the phase angle output from said first control means to calculate and output an estimation value of the first torque current and an estimation value of the first exciting current;

second control means for calculating and outputting a second absolute value of amplitude and a second phase angle of the motor primary current and a second motor primary frequency in accordance with the accelerator signal and the speed signal; and outputting a second torque current and a second exciting current as intermediate results of the calculation;

first comparison means for comparing the first absolute value of amplitude and the first phase angle of the motor primary current and the first motor primary frequency from said first control means with the second absolute value of amplitude and the second phase angle of the motor primary current and the second motor primary frequency from said second control means, respectively; and outputting a first fail-safe signal when said first comparison means determines that differences between the outputs from said first and second control means have magnitudes not less than a predetermined value for a predetermined period of time; and second comparison means for comparing the estimation value of the torque current and the estimation value of the exciting current which are output from said torque estimation means with the second torque current and the second exciting current which are output from said second control means, respectively; and outputting a second fail-safe signal when the second comparison means determines that differences between the estimation values from said torque estimation means and the currents output from said second control means have magnitudes not less than a predetermined value for a predetermined period of time.

\* \* \* \* \*